INVENTORS,
LOUIS A. POVINELLI
MARCUS F. HEIDMANN

BY
ATTORNEYS

United States Patent Office 3,345,822
Patented Oct. 10, 1967

3,345,822
BURNING RATE CONTROL OF SOLID PROPELLANTS
Louis A. Povinelli, Middleburg Heights, and Marcus F. Heidmann, Rocky River, Ohio, assignors to the United States of America as represented by the Administrator of the National Aeronautics and Space Administration
Filed Feb. 17, 1966, Ser. No. 529,593
7 Claims. (Cl. 60—251)

ABSTRACT OF THE DISCLOSURE

Controlling the burning rate of solid propellants by injecting pressurized hot gases into a rocket combustion chamber. These gases are injected tangentially around the longitudinal wall of the combustion chamber in a direction transversed to the longitudinal axis of the rocket motor.

---

The invention described herein was made by employees of the United States Government and may be manufactured and used by or for the Government of the United States of America for governmental purposes without the payment of any royalties thereon or therefor.

This invention relates to solid propellant rocket motors and more particularly to apparatus for regulating the mass burning rate of a solid propellant.

Solid propellant rocket propulsion systems could become a considerably more practical and versatile form of propulsion if they are provided with an accurate and reliable means of thrust control. The presently known techniques for controlling the rate of combustion of solid propellant rocket motors are either so complicated as to be impractical for reliable missile use, or are so bulky that the size advantages of solid propellant missiles are sacrificed.

It is therefore an object of the invention to provide a solid propellant rocket motor system wherein rocket thrust may be controlled by varying the rate of propellant combustion.

A further object of the invention is to provide a combustion rate control apparatus for a solid propulsion motor that is simple in construction, inexpensive to manufacture and highly effective in operation.

Briefly, the foregoing objects are accomplished by providing apparatus for injecting pressurized hot gases into the combustion chamber of a solid propellant rocket motor wherein said gases are injected tangentially around the longitudinal wall of the combustion chamber in a direction transverse to the longitudinal axis of the chamber to control the rate of combustion of the propellant charge and thereby control the thrust of the rocket. A typical solid fuel rocket motor consists of a cylindrical metal shell having an exhaust port and containing a shaped solid propellant charge of molded propellant material having a longitudinal bore forming a combustion chamber wherein combustion takes place. The propellant charge contains all the necessary ingredients for sustaining chemical combustion and, once ignited, the charge will burn on all exposed surfaces. Specifically, the burning takes place on the longitudinal wall of the propellant charge bore which forms the combustion chamber. It is well known that the rate of combustion in a solid propellant rocket varies with the pressure in the combustion chamber so that as the chamber pressure increases, the rate of burning also increases. It has been found that by directing pressurized hot gases tangentially around the periphery of the bore forming the combustion chamber in a direction transverse to the longitudinal axis of the bore a vortex flow field may be established within the combustor. The vortex flow with its attendant radial pressure distribution causes the effective throat area to be substantially reduced relative to the real throat area. The chamber pressure is therefore increased and the propellant burning rate, which is sensitive to pressure, is increased thereby. The tangential flow will also give rise to increased burning at sufficiently high velocities due to erosive effects. The rate of combustion of the solid propellant may be accurately controlled, and hence, the thrust of the rocket is correspondingly controlled. The pressurized hot gases may be supplied by a conventional auxiliary solid propellant charge gas generator having an igniter, all of standard construction. As a modification, the gas generator may be a hydrogen peroxide generator with a catalyst bed. The tangential injection of the hot gases establishes a vortex flow which controls the rate of combustion by causing an increase in chamber presusre as well as by causing erosive burning. In addition, a slight increase in burning rate results from the adjustment of the chamber pressure to the new burning rate.

Other objects and advantages of the invention will be apparent from the following description taken in conjunction with the drawings wherein.

Figure 1:
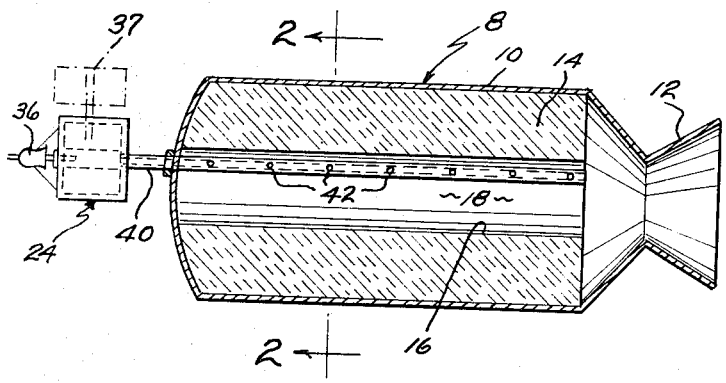
FIGURE 1 is a side elevational sectional view of a solid propulsion rocket motor constructed in accordance with the invention.
Figure 2:
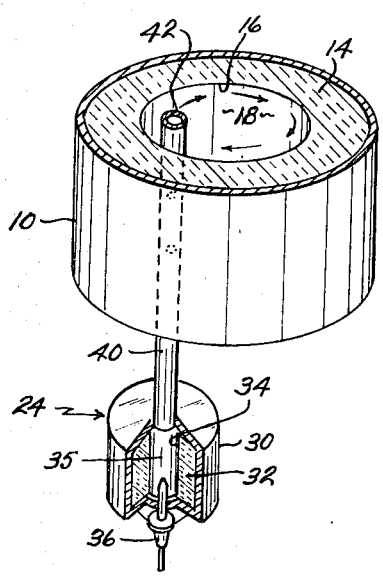
FIGURE 2 is a perspective sectional view of the rear portion of the rocket motor shown in FIGURE 1, with the auxiliary gas generator having a cut-away portion to show the interior thereof.

Although the invention is shown and described herein with reference to its use in a solid propellant rocket motor, it will be understood that it can effectively be used in any gas-generating device for controlling the rate of combustion therein.

Referring to the drawings, there is shown a solid propellant rocket motor 8, constructed in accordance with the invention, and including a hollow cylindrical shell or casing 10 having an exhaust or thrust nozzle 12. The casing 10 contains a conventional solid propellant charge 14 having a bore 16 forming a combustion chamber 18 contiguous with the nozzle 12. The propellant charge 14 is adapted to produce combustion products in the combustion chamber 18 which discharge through the nozzle 12 to produce thrust in the usual manner. The propellant charge may be a mixture of synthetic rubber and an inorganic oxidizer such as $NH_4ClO_4$.

Figure 3:
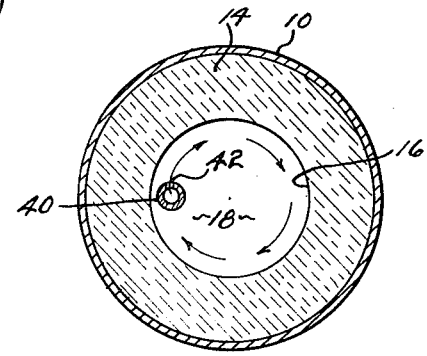
FIGURE 3 is a sectional view taken along the line 2—2 of FIGURE 1.

The invention is provided with a means for tangentially injecting hot gases into the combustion chamber 18 as will now be described. Exteriorly of the casing 10 there is provided, in the preferred form, an auxiliary gas generator 24 including a hollow cylindrical casing 30 having a solid propellant charge 32 therein. The propellant charge 32 has a longitudinal bore 34 forming a combustion chamber 35 and may be of the same material as the charge 14. A conventional igniter 36 is operatively secured to the end of the casing and is contiguous with the chamber 35 for igniting the charge 32 in the usual manner, or, as an alternate, the generator 24 may be provided with a hydrogen peroxide tank 37 as shown in dot-dash lines in FIGURE 1. The generator 24 may be any other suitable type of gas generator such as a hydrogen peroxide generator with a decomposition catalyst bed to allow for greater frequency of thrust modulation. The generator 24 contains an elongated injection tube operatively connected at one end to, and in communication with, the generator combustion chamber 35, the other end of the tube 40 extending longitudinally into the combustion chamber 18 of the rocket motor 8. The tube 40 has a plurality of spaced ports or outlets 42 for injecting the hot gases tangentially into the chamber 18 as shown by the arrows in FIGURE 3. The hot gases are injected at as high a velocity as is practicable.

Figure 4:
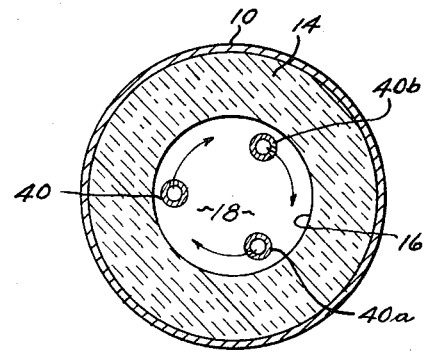
FIGURE 4 is a sectional view similiar to that of FIGURE 3, but showing a modification of the device shown therein.

To provide for a more continuous and even flow of the hot gases into the chamber 18, additional elongated injection tubes 40a and 40b may be longitudinally disposed in the chamber 18 and spaced circumferentially therearound as shown in FIGURE 4, such tubes 40a and 40b being connected, in one form of the invention, to the pipe 40 at a point between the casings 30 and 10, or each tube 40, 40a and 40b may be connected to a separate gas generator.

The invention also contemplates the method of injecting hot gases tangentially into a solid propellant combustion chamber to control the combustion rate therein by providing a solid propellant rocket motor having a solid propellant charge with a longitudinal bore forming a combustion chamber, and providing a source of pressurized hot gases and injecting said pressurized hot gases from said source into said combustion chamber tangentially around the longitudinal wall of the combustion chamber in a direction transverse to the longitudinal axis of the chamber to control the burning rate of the propellant charge.

With such tangential injection, burning rate increases of up to 75% greater than previous burning rates are achieved.

The terms and expressions which have been employed are used as terms of description, and not of limitation, and there is no intention, in the use of such terms and expressions, of excluding any equivalents of the features shown or described, or portions thereof, but it is recognized that various modifications are possible within the scope of the invention claimed.

What is claimed is:
1. A solid propellant rocket motor comprising, a casing having an exhaust nozzle, a combustible solid propellant charge disposed in said casing and having a longitudinal bore forming a combustion chamber contiguous with the nozzle, said propellant charge adapted to produce combustion products in said combustion chamber which discharge through the nozzle to produce thrust, and means for injecting pressurized hot gases into said combustion chamber tangentially around the longitudinal wall of the bore in a direction transverse to the longitudinal axis of the bore to control the rate of combustion of the propellant charge by the establishment of a vortex flow field within the combustion chamber, said means including a gas generator, and at least one elongated gas injection tube operatively connected to the generator and extending longitudinally into the bore, said tube having a plurality of spaced discharge ports for injecting the hot gases transversely tangentially around the longitudinal wall of the bore to control the rate of combustion of the propellant charge.

2. The structure of claim 1 wherein said means by which a vortex flow is generated comprises a plurality of said elongated injection tubes operatively connected to said generator, said tubes being longitudinally disposed in the bore and spaced circumferential around the inner longitudinal wall of the bore.

3. The structure of claim 1 wherein said gas generator comprises an auxiliary solid propellant charge having an igniter operatively secured thereto.

4. The structure of claim 1 wherein said propellant charge is a mixture of an inorganic oxidizer and a synthetic rubber.

5. The structure of claim 4 wherein said inorganic oridizer is $NH_4ClO_4$.

6. The structure of claim 1 wherein said gas generator is a hydrogen peroxide generator with a catalyst bed.

7. A solid propellant rocket motor comprising, a casing having an exhaust nozzle, a combustible solid propellant charge disposed in said casing and having a longitudinal bore forming a combustion chamber contiguous with the nozzle, said propellant charge adapted to produce combustion products in said combustion chamber which discharge through the nozzle to produce thrust, and means for injecting pressurized hot gases into said combustion chamber tangentially around the longitudinal wall of the bore in a direction transverse to the longitudinal axis of the bore to control the rate of combustion of the propellant charge by the establishment of a vortex flow field within the combustion chamber; said means including a plurality of gas generators each having an elongated injection tube operatively connected therewith and extending longitudinally into the bore, said tubes having a plurality of spaced discharge ports for injecting the hot gases transversely tangentially around the longitudinal wall of the bore to control the rate of combustion of the propellant charge.

References Cited

UNITED STATES PATENTS

| | | | |
|---|---|---|---|
| 3,031,842 | 5/1962 | Ledwith | 60—234 |
| 3,065,596 | 11/1962 | Schultz | 60—254 |
| 3,102,386 | 9/1963 | Proell | 60—254 X |
| 3,136,119 | 6/1964 | Avery | 60—254 X |
| 3,142,152 | 7/1964 | Sessums | 60—251 |
| 3,158,997 | 12/1964 | Blackman | 60—258 X |
| 3,298,181 | 1/1967 | Greiner | 60—251 |

CARLTON R. CROYLE, *Primary Examiner.*